(12) United States Patent
Milacic

(10) Patent No.: US 7,709,121 B2
(45) Date of Patent: May 4, 2010

(54) METHOD AND APPARATUS FOR RECIRCULATING UNUSED FUEL IN FUEL CELLS

(75) Inventor: Milos Milacic, New Boston, MI (US)

(73) Assignee: Ford Motor Company, Dearborn, MI (US)

( * ) Notice: Subject to any disclaimer, the term of this patent is extended or adjusted under 35 U.S.C. 154(b) by 963 days.

(21) Appl. No.: 10/927,180

(22) Filed: Aug. 25, 2004

(65) Prior Publication Data
US 2006/0046108 A1    Mar. 2, 2006

(51) Int. Cl.
H01M 8/00 (2006.01)
H01M 8/04 (2006.01)
H01M 8/18 (2006.01)

(52) U.S. Cl. ............................. 429/17; 429/13; 429/19

(58) Field of Classification Search ................... 429/13, 429/17, 19
See application file for complete search history.

(56) References Cited

U.S. PATENT DOCUMENTS

| | | | |
|---|---|---|---|
| 2,697,986 A | 12/1954 | Meagher, Jr. | |
| 3,542,597 A | 11/1970 | Smith et al. | |
| 3,572,982 A | 3/1971 | Kozdon | |
| 4,652,501 A | 3/1987 | Bennetto et al. | |
| 4,953,811 A | 9/1990 | Smith | |
| 5,532,573 A * | 7/1996 | Brown et al. | 322/22 |
| 5,951,262 A * | 9/1999 | Hartman | 417/356 |
| 2004/0219401 A1* | 11/2004 | Hobmeyr et al. | 429/13 |
| 2005/0127856 A1* | 6/2005 | Maslov | 318/254 |

FOREIGN PATENT DOCUMENTS

JP    2004190562 A * 7/2004

* cited by examiner

Primary Examiner—Patrick Ryan
Assistant Examiner—Karie O'Neill Apicella
(74) Attorney, Agent, or Firm—Tung & Associates

(57) ABSTRACT

Unused fuel in a fuel cell is recirculated in the anode loop and combined with fresh fuel using an electromagnetically driven pump. The pump includes a magnetic rotor mounted inside a conduit of nonmagnetic material that recirculates the fuel, and a plurality of electric stator coils disposed around the outside of the conduit. The stator coils are powered by either a AC or pulse train signal produced by a controller, and generate synchronous electromagnetic forces that spin rotor to force the gas through the recirculation loop.

22 Claims, 2 Drawing Sheets

ID OF THE INVENTION

The present invention broadly relates to managing the flow of gaseous fuels used in fuel cells, and deals more particularly with a method and apparatus for recirculating unused fuel using an electromagnetically driven pump.

BACKGROUND OF THE INVENTION

Fuel cells are electrochemical energy conversion devices that generate electricity and heat by converting the chemical energy of fuels. A single fuel cell normally consists of an electrolyte sandwiched between two electrodes, a porous anode and a cathode. While a variety of different fuel cell types have been developed, all operate on essentially the same principle. For a PEM fuel cell, hydrogen, or a hydrogen-rich fuel is fed to the anode where a catalyst separates the hydrogen's negatively charged electrons from positively charged ions (protons). The electrons from the anode side of the cell cannot pass through the membrane to the positively charged cathode; they must travel around it via an electrical circuit to reach the other side of the cell. This movement of electrons is an electrical current which is advantageously used to drive a load, such as an electric motor or other electrical system. Once delivered to the cathode via the electrical circuit, the electrons combine with the protons that have crossed the membrane and the oxygen from the air, resulting in water or hydroxide. For proton exchange membrane (PEM) and phosphoric acid fuel cells, protons move through the electrolyte to the cathode to combine with oxygen and electrons, producing water and heat. In other types of fuel cells such as solid oxide fuel cells (SOFC's), negative ions travel through the electrolyte to the anode where they combine with the hydrogen or other oxidizable "fuel"

In the case of hydrogen fuel cells, hydrogen fuel may be fed to the anode in what is sometimes referred to as the anode loop. The quantity of hydrogen fed to the anode is a function of variety of factors, including the relative purity of hydrogen fuel, low demand and other variable parameters that are unique to each fuel cell application.

In order to operate efficiently, the fuel cell must be supplied with more hydrogen fuel then it can actually convert. As a result, extra, unused hydrogen gas is discharged from the fuel cell. In order to increase operating efficiencies, it has been proposed that the unused hydrogen gas be circulated and combined with fresh gas from the hydrogen source before being redelivered to the anode of the fuel cell. Known hydrogen recirculating systems rely on comparatively complicated mechanical components, or electrical control systems that expose sensitive electronic components to potentially harsh environments found in fuel cells. It would therefore be desirable to provide a system for recirculating unused hydrogen fuel that is both simple in construction and well suited to operate within the adverse environment of the fuel cell. The present invention is directed toward satisfying this need.

SUMMARY OF THE INVENTION

Unused hydrogen gas is returned to the anode of a fuel cell using an electromagnetically driven pump which is particularly simple in design, relies on relatively few components and is easily controllable to achieve precise flow rates in the recirculation loop. Another advantage of the invention is that the recirculation pump can be housed directly inside the recirculation conduitline, thereby saving space and simplifying installation. A further feature of the pump is its ability to be precisely controlled by the fuel cell's master controller that controls a variety of other functions of the cell. It is also an advantage of the invention that the moving parts of the pump are completely contained within a hydrogen gas environment, while electrical parts are housed outside of the fuel rich environment.

According to one aspect of the invention, apparatus is provided for recirculating a gaseous fuel used to power a fuel cell. The apparatus includes an electromagnetically powered pump incorporated in the recirculation conduitline, connecting the anode exhaust with the anode gas fuel inlet. The pump includes a rotor formed of a magnetic material and mounted for a rotation within the conduitline, and an electrical stator circumscribing the exterior wall of the conduit. The stator includes a plurality of stator coils that are magnetically coupled with the rotor. A controller delivers an AC power signal or a pulse train signal to the stator, producing a synchronously varying electromagnetic field that forces the magnetic rotor blades to spin and resulting in the rotor pump fuel through the recirculating conduitline. The stator coils are preferably evenly circumferentially spaced around the outside of the conduit. The rotor is mounted on the inside wall of the conduit using one or more support struts. The rotor blades may either be formed of magnetic material, or include magnetic elements near the outer tips of the blades in order to magnetically interact with the field produced by the stator coils.

According to another aspect of the invention, a method is provided for recirculating unused gaseous fuel in the anode loop of the fuel cell, comprising: pumping the unused fuel through a recirculation conduit using an electromagnetically driven pump. The pumping includes powering the stator with an electrical signal having a variable characteristic related to the desired rotation speed of the rotor. The method includes placing a magnetic rotor inside the conduit and placing a plurality of stator elements around the outside of the conduit.

These non-limiting features, as well as other advantages of the present invention may be better understood by considering the following details of a description of a preferred embodiment of the present invention. In the course of this description reference will frequently be made to the attached drawings.

DETAILED DESCRIPTION OF THE PREFERRED EMBODIMENT

Figure 1:
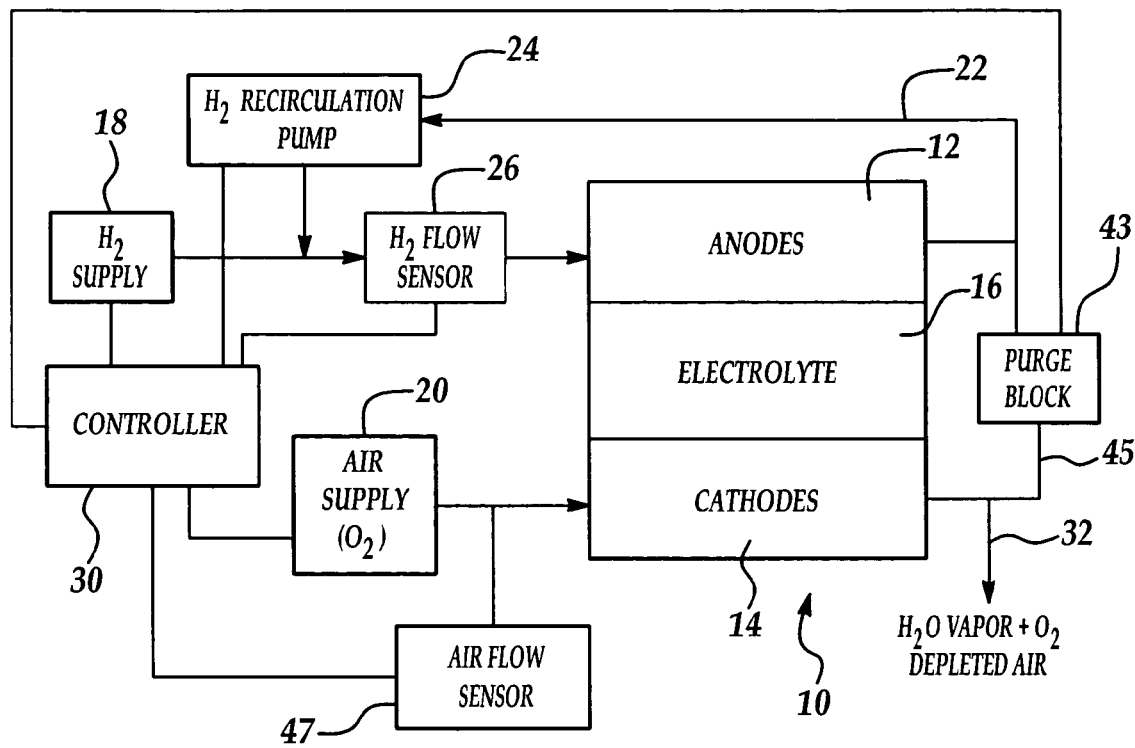
FIG. 1 is a highly simplified block diagram of a fuel cell system having a hydrogen gas recirculation loop employing the recirculation pump forming the preferred embodiment of the invention.

Referring first to FIG. 1, a fuel cell stack 10 includes an electrolyte 16 sandwiched between anodes 12 and cathodes 14. An oxidizing agent such as air is delivered from a supply 20 through a conduitline to a plenum (not shown) which directs the air onto the surface of the cathodes 14 where the oxygen contained in the air is reduced.

A gaseous fuel such as hydrogen from a supply 18 thereof is similarly delivered by a conduitline to a plenum (not shown) which directs the hydrogen over the surface of the anodes 12. The oxygen reduced at the cathodes 14 is converted into negatively charged oxygen ions which travel through the electrolyte 16 to the anodes 12 where they react with the hydrogen fuel gas. The fuel gas is oxidized by the oxygen ions and releases electrons to an external circuit (now shown) where they produce an electromotive force to drive a desired load. The oxygen ions also combine with the hydrogen at the surface of the anodes 12 to produce water which is carried away along with excess oxygen depleted air via a discharged line 32. Electrons continue flowing to the circuit to the cathode 14 where they reduce oxygen from the air, thus continuing the electricity-generating cycle. A purge block 43 is connected with the discharge line 32 to allow purging of a later described recirculation line 22.

In order to generate a desired level of electricity, a plurality of individual fuel cells are stacked together and connected in series to form the fuel cells stack 10. The individual fuel cells forming the stack 10 may be any of several configurations, including monolithic, planar or tubular. Regardless of the exact cell geometry, the fuel cells are stacked so as to create a series of gas flow channels therebetween. In one well known arrangement, the cells are arranged to provide so-called cross flow or orthogonal flow, in which the hydrogen fuel gas and the air flow in orthogonal directions to each other, and alternating flow channels between the fuel cells.

Excess, unused hydrogen gas fuel exits the plenum (not shown) covering the surface of the anodes 12 and is returned in a recirculating conduitline 22 so is to be combined with fresh hydrogen gas from the hydrogen supply 18. The mass flow of hydrogen delivered to the anodes 12 is measured using a mass flow sensor 26 which may be a conventional device, or a specially designed sensor. A conventional air flow sensor 47 measures the flow of air from the supply 20 to the fuel cell 10 and provides air flow information to the controller 30. The excess hydrogen gas is drawn through recirculating conduitline 22 by a hydrogen gas recirculation pump 24 which will be described later in more detail. A master controller 30 receives signals from the mass flow sensor 26 indicative of the mass flow rate of hydrogen to the anodes 12 and sends control signals to the supply 18 and pump 24 so as to maintain a desired flow rate of hydrogen to the anodes 12. The functions of the controller 30 may be included in and carried out by one or more master controllers which control other operations of the fuel cell stack 10.

Figure 2:
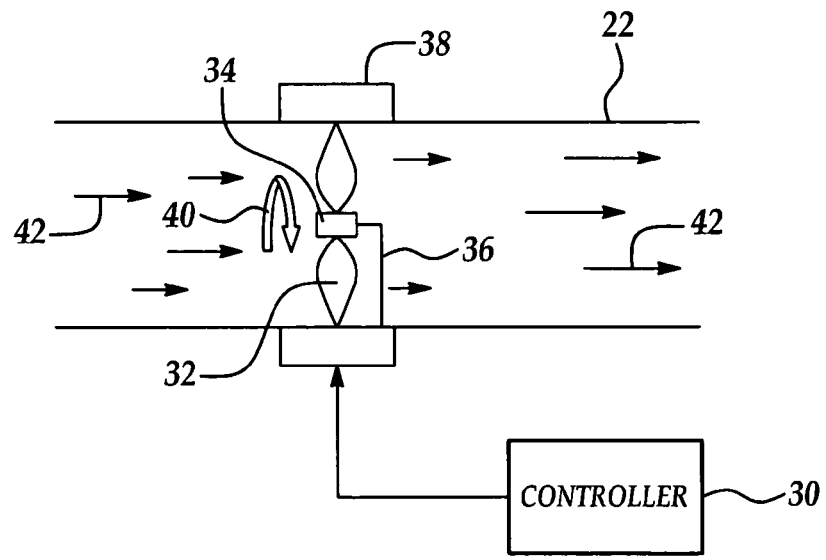
FIG. 2 is a combined block diagram and cross sectional few of a portion of the recirculating conduitline, showing the mounting position of the pump.
Figure 3:
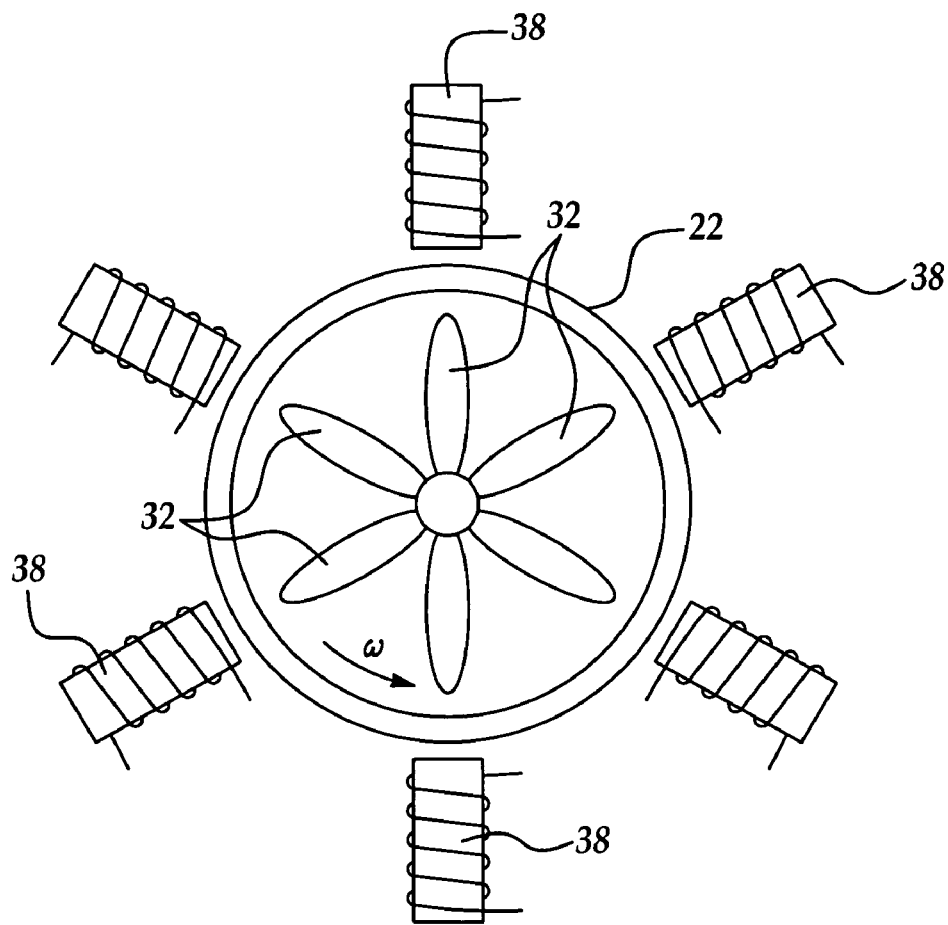
FIG. 3 is a cross sectional view of the conduit shown in FIG. 2, depicting the relationship between the conduit, the rotor and the stator coils; and, FIG. 4 is a fragmentary, side elevational view of one of the rotor blades, depicting magnetic blade tips.
Figure 4:
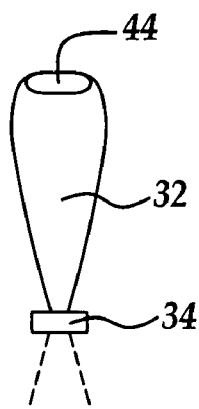

Referring now also to FIG. 2-4 the recirculation pump 24 includes a rotor 34 having a central hub on which there is secured a plurality of circumferentially spaced rotor blades 32. The rotor blades 32 extend radially so as to span across essentially the full diameter of the conduit 22, and thus across the full cross sectional flow of hydrogen gas which flows in the direction designated by the arrows 42. The rotor hub is journal led for rotation on a strut 36 which is secured to the interior sidewall of the conduit 22 and functions to support the entire rotor 34. Although a single strut is shown in the illustrated embodiment, a plurality of the struts 36 or other similar support structure may be employed depending on the application. Such support structure should be designed so as to create minimum drag on the flow of hydrogen gas through the conduit 22.

The rotor blades 32 are preferably formed of a magnetic material. Alternatively, however, rotor blades 32 may be formed of a non-magnetic material such as plastic, in which case one or more of the blades 32 is provided with an insert 44 of magnetic material (i.e., permanent magnets) near the blade tip. An electrical stator is formed by a plurality of circumferentially spaced electrical stator coils 38 which are disposing around the outer circumferential wall of the conduitline 22 so as to be magnetically coupled with the rotor blades 32. The conduitline 22 must be formed of a non-magnetic material, so as not to interfere with the magnetic circuit formed between the coils 38 and the rotor blades 32.

From the forgoing, it can be appreciated that the electrical portions of the pump 24 are advantageously disposed entirely outside of the hydrogen gas environment of the conduit 22, while only the simple mechanical components of the pump are subject to the gas environment.

In operation, the controller 30 sends either a pulse train or a sinusoidal (AC) signal to the coils 38, thereby synchronizely energizing the coils 38 at a frequency determined by that of the applied signal. The energized coils 38 produce a synchronously varying electromagnetic field (and related forces) which attracts the ferromagnetic rotor blades 32, causing the rotor 34 to spin about the central hub, in the direction of the arrow 40. The blades 32 are configured to force the flow of hydrogen gas through the conduitline 22. The exact size shape and number of the rotor blades will depend on the specific application and the desired flow rates. Depending on the flow rates that must be achieved, the rotor 34 is made to spin at relatively high rates of speed due to the fact that hydrogen is a relatively light gas. In any event, the speed of the rotor 32 and thus the gas flow rate, is directly dependent on the frequency of the excitation signal delivered by the controller 30

Although a stator comprising 6 poles (coils 38) has been disclosed (suitable for being powered as in a three phase power system), a different number of poles may be employed, depending on the application. By varying the current delivered through the stator coils 38, the induced electromagnetic field induced is superimposed over the existing magnetic field of the blades 32, generating the force that causes the rotor 34 to spin. The number of the stator coils 38 determines the exact nature of the required excitation signals that must be produced by the controller 30. The frequency of the excitation signal is directly proportional to the rotational speed of the rotor 34. The flow rate of recirculated hydrogen gas is a function of the selected frequency of the excitation signal. The excitation signal can be any periodic signal with the desired frequency however sinusoidal or pulse train signals are generally most suitable.

The mass flow sensor 26 senses the mass flow of hydrogen gas being delivered to the anodes 12 and delivers a signal to the controller 32 indicative of the mass flow rate. The controller 30 then adjusts the speed of the recirculation pump 24 and/or the speed of a pump (not shown) that controls the supply of fresh hydrogen from the supply 18, to assure that hydrogen gas is supplied to the anodes 12 at the proper rate. In some cases, a conventional gas analyzer sensor (not shown) may also be used to provide information to the controller which is taken into consideration in adjusting the speed of the pump 24. It should be noted here that it may be necessary to calibrate the recirculation pump 24 prior to initial use.

It is to be understood that the device and method which has been described are merely illustrative of one application of the principles of the invention. Numerous modifications may be made to the device of the method as described without departing from the true spirit and scope of the invention.

What is claimed:

1. An apparatus adapted to recirculate a gaseous fuel used to power a fuel cell, comprising:

a tubular conduit positioned to deliver recirculated fuel to the fuel cell;

a rotor mounted to spin inside and with respect to the conduit while said conduit remains stationary, said rotor comprising radially extending blades immediately adjacent an inside portion of said conduit, said rotor operative to pump the fuel through the conduit, the rotor including magnetic material;

an electrical stator disposed on and around an outer circumference comprising an outside portion of the conduit, said electrical stator magnetically coupled with the rotor, said electrical stator generating an electromagnetic force field through said conduit driving the rotor to spin.

2. The apparatus of claim 1, wherein the rotor includes a plurality of said radially extending blades circumferentially spaced with respect to an inner circumference of said conduit, said blades positioned to force the flow of the fuel through the conduit.

3. The apparatus of claim 2 wherein the magnetic material includes permanent magnets carried near the outer end of at least certain of the blades.

4. The apparatus of claim 2, wherein each of the blades comprises the magnetic material.

5. The apparatus of claim 1, including a mounting support attached to the interior of the conduit, and wherein the rotor is rotatably attached to the support.

6. The apparatus claim 1, wherein the stator includes a plurality of electrical stator elements, said plurality of electrical stator elements circumferentially spaced around the outside of the conduit, each electrical stator element coupled with a controller.

7. The apparatus of claim 6, wherein each of the stator elements includes an electromagnetic coil generating the magnetic force field.

8. The apparatus of claim 1, wherein the conduit comprises a non-magnetic material.

9. The apparatus of claim 1, wherein the fuel is hydrogen.

10. The apparatus of claim 1, including a controller coupled with the stator, said controller controlling power to the stator, and a sensor coupled with the controller, said sensor sensing the mass flow of fuel into the fuel cell, wherein the controller is operative to control the speed of the rotor in accordance with the sensed mass flow.

11. The apparatus of claim 1, including a controller controlling power to the stator using an AC signal having a frequency related to a commanded fuel flow rate.

12. The apparatus of claim 1, including a controller controlling power to the stator using a pulse train signal.

13. The apparatus of claim 1, wherein the fuel is a gaseous fuel.

14. The apparatus of claim 1, wherein the fuel is hydrogen gas.

15. The apparatus of claim 2, wherein at least a portion of at least one of said circumferentially spaced blades comprises a magnetic material.

16. The apparatus of claim 1, wherein said conduit comprises a recirculation loop in communication with an anode portion of said fuel cell.

17. An apparatus adapted to recirculate a gaseous fuel used to power a fuel cell, comprising:

a tubular conduit positioned to deliver recirculated fuel to the fuel cell;

a rotor comprising a plurality of circumferentially spaced and radially extending blades extending from said rotor, at least one of said circumferentially spaced blades comprising a magnetic material, said rotor mounted to spin inside and with respect to the conduit while said conduit remains stationary, said blades immediately adjacent an inside portion of said conduit, said rotor operative to pump the fuel through the conduit;

an electrical stator disposed on and around an outer circumference comprising an outside portion of the conduit, said electrical stator magnetically coupled with the rotor, said conduit consisting of non-magnetic material, said electrical stator generating an electromagnetic force field through said conduit driving the rotor to spin.

18. The apparatus claim 17, wherein the magnetic material is located at least near the tip of said at least one of said circumferentially spaced blades.

19. The apparatus claim 17, wherein the stator includes a plurality of electrical stator elements, said plurality of electrical stator elements circumferentially spaced around the outside of the conduit, each electrical stator element coupled with a controller.

20. The apparatus of claim 19, wherein each of the stator elements includes an electromagnetic coil generating the magnetic force field.

21. The apparatus of claim 17, including a controller coupled with the stator, said controller controlling power to the stator, and a sensor coupled with the controller, said sensor sensing the mass flow of fuel into the fuel cell, wherein the controller is operative to control the speed of the rotor in accordance with the sensed mass flow.

22. The apparatus of claim 17, including a controller controlling power to the stator using a signal selected from the group consisting of an AC signal having a frequency related to a commanded fuel flow rate a pulse train signal.

* * * * *